(12) United States Patent
Gwoo et al.

(10) Patent No.: US 11,780,766 B2
(45) Date of Patent: *Oct. 10, 2023

(54) ENAMEL COMPOSITION, METHOD FOR PREPARING ENAMEL COMPOSITION, AND COOKING APPLIANCE

(71) Applicant: LG ELECTRONICS INC., Seoul (KR)

(72) Inventors: Dong Gun Gwoo, Seoul (KR); Jingon Kim, Seoul (KR); Young Seok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 654 days.

This patent is subject to a terminal disclaimer.

(21) Appl. No.: 16/796,102

(22) Filed: Feb. 20, 2020

(65) Prior Publication Data
US 2020/0270171 A1    Aug. 27, 2020

(30) Foreign Application Priority Data
Feb. 22, 2019    (KR) .................. 10-2019-0021141

(51) Int. Cl.
*C03C 8/06*    (2006.01)
*C03C 8/08*    (2006.01)
(Continued)

(52) U.S. Cl.
CPC ............ *C03C 8/08* (2013.01); *A47J 36/025* (2013.01); *A47J 36/04* (2013.01); *C03C 3/064* (2013.01);
(Continued)

(58) Field of Classification Search
CPC .. C03C 8/06; C03C 8/08; A47J 36/025; F24C 15/005
See application file for complete search history.

(56) References Cited

U.S. PATENT DOCUMENTS 3,547,098 A    12/1970    Lee
3,580,733 A    5/1971    Ott
(Continued)

FOREIGN PATENT DOCUMENTS

BG          98027       3/1994
CN        1042890       6/1990
(Continued)

OTHER PUBLICATIONS

United States Office Action dated Apr. 4, 2022 issued in co-pending related U.S. Appl. No. 16/796,127.
(Continued)

*Primary Examiner* — Karl E Group
(74) *Attorney, Agent, or Firm* — KED & ASSOCIATES

(57) ABSTRACT

An enamel composition, a method for preparing an enamel composition, and a cooking appliance are provided. The enamel composition may include phosphorus pentoxide ($P_2O_5$) at 15 to 50 wt %; silicon dioxide ($SiO_2$) at 10 to 20 wt %; boron oxide ($B_2O_3$) at 1 to 15 wt %; one or more of lithium oxide ($Li_2O$), sodium oxide ($Na_2O$), or potassium oxide ($K_2O$) at 5 to 20 wt %; one or more of sodium fluoride (NaF), calcium fluoride ($CaF_2$), or aluminum fluoride ($AlF_3$) at 1 to 5 wt %; one or more of magnesium oxide (MgO), barium oxide (BaO), or calcium oxide (CaO) at 1 to 35 wt %; and one or more of titanium dioxide ($TiO_2$), cerium dioxide ($CeO_2$), molybdenum trioxide ($MoO_3$), bismuth oxide ($Bi_2O_3$), or copper oxide (CuO) at 10 to 25 wt %, such that a heating time required for cleaning may be shortened and oil contaminants may be completely removed.

2 Claims, 3 Drawing Sheets

(51) Int. Cl.

| | | |
|---|---|---|
| A47J 36/04 | (2006.01) | |
| F24C 15/02 | (2006.01) | |
| A47J 36/02 | (2006.01) | |
| C03C 3/064 | (2006.01) | |
| C03C 3/066 | (2006.01) | |
| C23D 1/00 | (2006.01) | |
| C23D 5/02 | (2006.01) | |
| F24C 15/00 | (2006.01) | |
| C03C 17/04 | (2006.01) | |

(52) U.S. Cl.
CPC ............... *C03C 3/066* (2013.01); *C23D 1/00* (2013.01); *C23D 5/02* (2013.01); *F24C 15/005* (2013.01); *F24C 15/02* (2013.01); *C03C 17/04* (2013.01); *C03C 2207/04* (2013.01); *C03C 2218/17* (2013.01)

(56) References Cited

U.S. PATENT DOCUMENTS

| | | | |
|---|---|---|---|
| 4,084,975 | A | 4/1978 | Faust |
| 4,147,835 | A | 4/1979 | Nishino et al. |
| 4,460,630 | A | 7/1984 | Nishino et al. |
| 4,515,862 | A | 5/1985 | Maki et al. |
| 4,877,758 | A | 10/1989 | Lee et al. |
| 5,650,364 | A | 7/1997 | Münstedt et al. |
| 5,747,395 | A | 5/1998 | Smith et al. |
| 6,123,874 | A | 9/2000 | Fukaya et al. |
| 6,321,569 | B1 | 11/2001 | Sreeram et al. |
| 6,350,495 | B1 | 2/2002 | Schriener et al. |
| 6,429,161 | B1 | 8/2002 | Souchard et al. |
| 6,511,931 | B1 | 1/2003 | Baldwin |
| 6,566,289 | B2 | 5/2003 | Aronica et al. |
| 6,652,972 | B1 | 11/2003 | Conzone et al. |
| 6,881,690 | B2 | 4/2005 | Kawamura et al. |
| 6,924,246 | B2 | 8/2005 | Kato et al. |
| 7,763,557 | B2 | 7/2010 | Baldwin et al. |
| 8,815,347 | B2 | 8/2014 | Shimoda et al. |
| 11,401,201 | B2 * | 8/2022 | Gwoo ..................... C03C 8/06 |
| 2003/0064874 | A1 | 4/2003 | Eckmann |
| 2003/0119647 | A1 | 6/2003 | Sanichi et al. |
| 2003/0162646 | A1 | 8/2003 | Kawamura et al. |
| 2003/0187118 | A1 | 10/2003 | Aronica et al. |
| 2004/0043053 | A1 | 3/2004 | Yu et al. |
| 2004/0069764 | A1 | 4/2004 | Imai et al. |
| 2005/0014625 | A1 | 1/2005 | Espargilliere et al. |
| 2005/0148722 | A1 | 7/2005 | Aronica et al. |
| 2008/0044488 | A1 | 2/2008 | Zimmer et al. |
| 2009/0311514 | A1 | 12/2009 | Shon et al. |
| 2010/0009837 | A1 | 1/2010 | Sakoske |
| 2010/0264126 | A1 | 10/2010 | Baek et al. |
| 2011/0011423 | A1 | 1/2011 | Baek et al. |
| 2011/0049122 | A1 | 3/2011 | Baek et al. |
| 2011/0174826 | A1 | 7/2011 | Le Bris et al. |
| 2011/0262758 | A1 | 10/2011 | Benford, Jr. et al. |
| 2011/0277505 | A1 | 11/2011 | Sakoske |
| 2013/0045389 | A1 | 2/2013 | Benford, Jr. |
| 2013/0149444 | A1 | 6/2013 | Le Bris et al. |
| 2013/0299482 | A1 | 11/2013 | Kim et al. |
| 2013/0299484 | A1 | 11/2013 | Lee et al. |
| 2015/0083109 | A1 | 3/2015 | Baek et al. |
| 2018/0170797 | A1 | 6/2018 | Gorecki et al. |
| 2018/0201538 | A1 | 7/2018 | De Strycker |
| 2018/0215654 | A1 | 8/2018 | Choi et al. |
| 2018/0215655 | A1 | 8/2018 | Kim et al. |
| 2019/0002336 | A1 | 1/2019 | Kim et al. |
| 2019/0092680 | A1 | 3/2019 | Kim et al. |
| 2019/0337837 | A1 | 11/2019 | Kim et al. |
| 2020/0115274 | A1 | 4/2020 | Awagakubo et al. |
| 2020/0148583 | A1 | 5/2020 | Choi et al. |
| 2020/0270167 | A1 | 8/2020 | Choi et al. |
| 2020/0270168 | A1 | 8/2020 | Choi et al. |
| 2020/0270170 | A1 * | 8/2020 | Gwoo ..................... C03C 3/062 |
| 2020/0270171 | A1 | 8/2020 | Gwoo et al. |

FOREIGN PATENT DOCUMENTS

| | | |
|---|---|---|
| CN | 1105343 | 7/1995 |
| CN | 1108626 | 9/1995 |
| CN | 1176942 | 3/1998 |
| CN | 1487240 | 4/2004 |
| CN | 1892962 | 1/2007 |
| CN | 101067207 | 11/2007 |
| CN | 101094818 | 12/2007 |
| CN | 101182119 | 5/2008 |
| CN | 101519275 | 9/2009 |
| CN | 101519276 | 9/2009 |
| CN | 101734858 | 6/2010 |
| CN | 102066011 | 5/2011 |
| CN | 102086091 | 6/2011 |
| CN | 102089253 | 6/2011 |
| CN | 102219383 | 10/2011 |
| CN | 102368933 | 3/2012 |
| CN | 102369168 | 3/2012 |
| CN | 102422085 | 4/2012 |
| CN | 102517582 | 6/2012 |
| CN | 104891805 | 9/2015 |
| CN | 104891810 | 9/2015 |
| CN | 105621889 | 6/2016 |
| CN | 106957149 | 7/2017 |
| CN | 107513747 | 12/2017 |
| CN | 108059341 | 5/2018 |
| CN | 108675636 | 10/2018 |
| CN | 108863074 | 11/2018 |
| EP | 0 086 109 | 8/1983 |
| EP | 1 160 283 | 12/2001 |
| EP | 1 256 556 | 11/2002 |
| EP | 1 298 099 | 4/2003 |
| EP | 1 559 692 | 8/2005 |
| EP | 2 662 341 | 11/2013 |
| EP | 3 357 877 | 8/2018 |
| EP | 3 459 914 | 3/2019 |
| EP | 3 578 525 | 12/2019 |
| EP | 3 650 414 | 5/2020 |
| GB | 1 214 261 | 12/1970 |
| HU | 01 00796 | 8/2002 |
| JP | S54-77618 | 6/1979 |
| JP | S54-106529 | 8/1979 |
| JP | 54153819 A * | 12/1979 |
| JP | 5575740 A * | 6/1980 |
| JP | S55-75740 | 6/1980 |
| JP | S63-230537 | 9/1988 |
| JP | S63-230538 | 9/1988 |
| JP | 2001-080935 | 3/2001 |
| JP | 2002-367510 | 12/2002 |
| JP | 2004-269322 | 9/2004 |
| JP | 2004-358846 | 12/2004 |
| JP | 2005-008974 | 1/2005 |
| JP | 2014-148465 | 8/2014 |
| JP | 2014-221937 | 11/2014 |
| JP | 2016-030849 | 3/2016 |
| KR | 10-2011-0023079 | 3/2011 |
| KR | 10-2013-0125907 | 11/2013 |
| KR | 10-2013-0125910 | 11/2013 |
| KR | 10-2013-0125918 | 11/2013 |
| KR | 10-2014-0014658 | 2/2014 |
| KR | 10-2014-0115562 | 10/2014 |
| KR | 10-1476501 | 12/2014 |
| KR | 10-2018-0089988 | 8/2018 |
| RU | 2007112383 | 10/2008 |
| WO | WO 95/09131 | 4/1995 |
| WO | WO 01/92413 | 12/2001 |
| WO | WO 02/02471 | 1/2002 |
| WO | WO 03/008354 | 1/2003 |
| WO | WO 2018/143704 | 8/2018 |
| WO | WO 2018/198986 | 11/2018 |
| WO | WO 2019/203565 | 10/2019 |

OTHER PUBLICATIONS

European Search Report dated Mar. 24, 2020 issued in Application No. 19207979.6.

(56) References Cited

OTHER PUBLICATIONS

United States Notice of Allowance dated Nov. 23, 2021 issued in co-pending related U.S. Appl. No. 16/795,923.
European Search Report dated Jun. 24, 2020 issued in EP Application No. 20158729.2.
European Search Report dated Jun. 24, 2020 issued in EP Application No. 20158736.7.
European Search Report dated Jun. 24, 2020 issued in EP Application No. 20158756.5.
European Search Report dated Jun. 29, 2020 issued in EP Application No. 20158751.6.
European Search Report dated Jul. 22, 2020 issued in EP Application No. 20158670.8.
European Search Report dated Jul. 22, 2020 issued in EP Application No. 20158683.1.
European Search Report dated Jul. 22, 2020 issued in EP Application No. 20158690.6.
United States Office Action dated Mar. 25, 2021 issued in co-pending related U.S. Appl. No. 16/666,979.
United States Office Action dated Apr. 6, 2021 issued in co-pending related U.S. Appl. No. 16/676,903.
U.S. Office Action issued in U.S. Appl. No. 16/796,052 dated Oct. 5, 2022.
Chinese Office Action dated Jul. 26, 2021 issued in CN Application No. 1911042287.3.
Chinese Office Action dated Jul. 27, 2021 issued in CN Application No. 202010107767.X.
Chinese Office Action dated Jul. 28, 2021 issued in CN Application No. 202010107396.5.
Chinese Office Action dated Jul. 28, 2021 issued in CN Application No. 202010107406.5.
Chinese Office Action dated Jul. 28, 2021 issued in CN Application No. 202010107479.4.
Chinese Office Action dated Jul. 28, 2021 issued in CN Application No. 202010107792.8.
Chinese Office Action dated Aug. 2, 2021 issued in CN Application No. 201911087064.9.
Chinese Office Action dated Aug. 2, 2021 issued in CN Application No. 202010107397.X.
Chinese Office Action dated Aug. 2, 2021 issued in CN Application No. 202010107499.1.
U.S. Office Action dated May 5, 2023 issued in U.S. Appl. No. 16/795,959.

* cited by examiner

ENAMEL COMPOSITION, METHOD FOR PREPARING ENAMEL COMPOSITION, AND COOKING APPLIANCE

CROSS-REFERENCE TO RELATED APPLICATIONS

This application claims priority to and the benefit of Korean Patent Application No. 10-2019-0021141, filed in Korea on Feb. 22, 2019, the disclosure of which is incorporated herein by reference in its entirety.

BACKGROUND

1. Field

An enamel composition, a method for preparing an enamel composition, and a cooking appliance are disclosed herein.

2. Background

Enamel is a material made by applying a vitreous glaze onto a surface of a metal plate. Common enamel is used in cooking appliances, such as microwaves and ovens. Cooking appliances, such as electric ovens and gas ovens, for example, are appliances that cook food or other items (hereinafter, collectively "food") using a heating source. As contaminants generated during cooking adhere to an inner wall of a cavity of the cooking appliance, the inner wall of the cavity needs to be cleaned. In this case, enamel applied onto the inner wall surface of the cavity of the cooking appliance facilitates removal of contaminants adhered to the cooking appliance. Generally, a pyrolysis method, in which contaminants are burned at high temperature to produce ashes, is known as a technique that easily cleans the inner wall of the cavity, and as a enamel composition to which the pyrolysis method can be applied, an enamel composition containing components, such as phosphorus pentoxide ($P_2O_5$), silicon dioxide ($SiO_2$), and boron oxide ($B_2O_3$), for example, is known.

However, the conventional enamel compositions consume a large amount of energy because the conventional enamel compositions enable cleaning only when heated (pyrolyzed) under a condition of a high temperature of 450 to 500° C. for about 4 hours. Further, in the case of the conventional enamel compositions, oil contaminants, such as cattle, pig, and poultry oils, cannot be removed easily. Furthermore, enamel compositions should not be denatured and damaged at a high temperature of 450 to 500° C., but the conventional enamel compositions have a problem of degradation of durability at high temperature.

BRIEF DESCRIPTION OF THE DRAWINGS

Embodiments will be described in detail with reference to the following drawings in which like reference numerals refer to like elements, and wherein.

DETAILED DESCRIPTION

Enamel Composition

Figure 1:
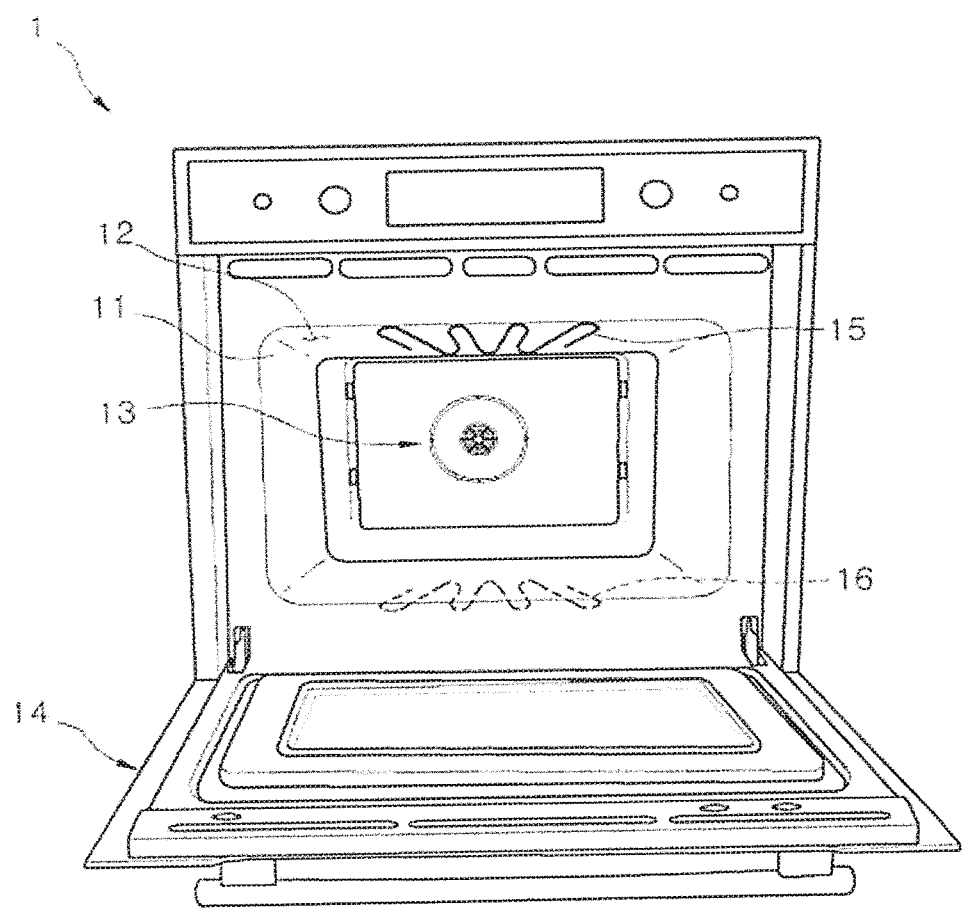
FIG. 1 is a front perspective view of a cooking appliance according to an embodiment.
Figure 2:
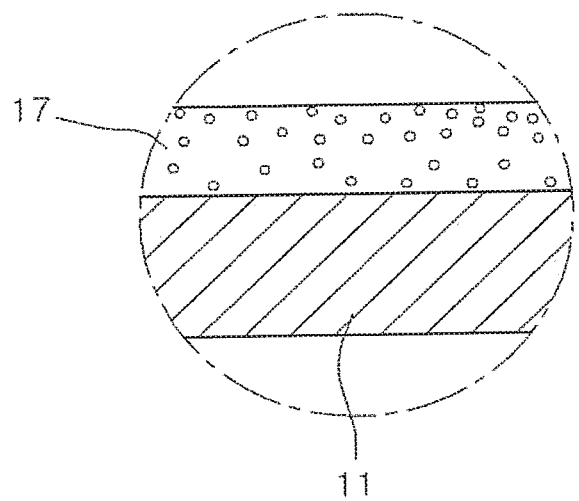
FIG. 2 is a partially enlarged cross-sectional view of an inner surface of a cavity of the cooking appliance of FIG. 1.

An enamel composition according to embodiments may include phosphorus pentoxide ($P_2O_5$) at 15 to 50 wt %; silicon dioxide ($SiO_2$) at 10 to 20 wt %; boron oxide ($B_2O_3$) at 1 to 15 wt %; one or more of lithium oxide ($Li_2O$), sodium oxide ($Na_2O$), or potassium oxide ($K_2O$) at 5 to 20 wt %; one or more of sodium fluoride (NaF), calcium fluoride ($CaF_2$), or aluminum fluoride ($AlF_3$) at 1 to 5 wt %; one or more of magnesium oxide (MgO), barium oxide (BaO), and calcium oxide (CaO) at 1 to 35 wt %; and one or more of titanium dioxide ($TiO_2$), cerium dioxide ($CeO_2$), molybdenum oxide ($MoO_3$), bismuth oxide ($Bi_2O_3$), or copper oxide (CuO) at 10 to 25 wt %.

$P_2O_5$ is a component that functions to form an alkali phosphate glass structure. In addition, $P_2O_5$ is a glass former that facilitates the addition of a large amount of transition metal oxides to the enamel composition and helps water to penetrate between the enamel surface and a contaminant such that the contaminant is able to be easily removed. $P_2O_5$ may be included at 15 to 50 wt %. When $P_2O_5$ is included at greater than 50 wt %, vitrification of the enamel composition may be difficult, and thermal properties of the enamel composition may be degraded. When $P_2O_5$ is included at less than 15 wt %, an amount of added transition metal oxides may be decreased, degrading cleanability.

$SiO_2$ is a component that forms a glass structure. $SiO_2$ strengthens a skeleton of the glass structure to enhance chemical resistance of the enamel composition. $SiO_2$ may be included at 10 to 20 wt %. When $SiO_2$ is included at greater than 20 wt %, it may interfere with the addition of transition metal oxides, degrading cleanability. When $SiO_2$ is included at less than 10 wt %, the glass composition may break down.

$B_2O_3$ serves as a glass former and is a component that acts to allow each component of the enamel composition to be uniformly melted. In addition, $B_2O_3$ serves to adjust a coefficient of thermal expansion and a fusion flow of the enamel composition to enhance coatability. $B_2O_3$ may be included at 1 to 15 wt %. When $B_2O_3$ is included at greater than 15 wt %, it may interfere with the addition of transition metal oxides to degrade cleanability. When $B_2O_3$ is included at less than 1 wt %, the glass composition may break down, or the glass composition may be crystallized.

$Li_2O$, $Na_2O$, and $K_2O$ serve to enhance cleanability of the enamel composition. One or more of $Li_2O$, $Na_2O$, or $K_2O$ may be included at 5 to 20 wt % in the enamel composition. When the one or more of the $Li_2O$, the $Na_2O$, or the $K_2O$ are included at greater than 20 wt %, a coefficient of thermal expansion of the glass may be greatly increased, degrading coatability. When the one or more of the $Li_2O$, the $Na_2O$, or the $K_2O$ are included at less than 5 wt %, cleanability may be degraded.

NaF, $CaF_2$, and $AlF_3$ are components that control a surface tension of an enamel coating layer to enhance surface characteristics of the enamel coating layer. One or more of NaF, $CaF_2$, or $AlF_3$ may be included at 1 to 5 wt % in the enamel composition. When the one or more of the NaF, the $CaF_2$, or the $AlF_3$ are included at greater than 5 wt %, thermal properties may be degraded. When the one or more of the NaF, the $CaF_2$, pr $AlF_3$ are included at less than 1 wt %, surface characteristics of the enamel coating layer may be degraded.

MgO, BaO, and CaO are components that enhance adhesion between a enamel coating layer and a base steel plate. One or more of MgO, BaO, or CaO may be included at 1 to 35 wt % in the enamel composition. When the one or more of the MgO, the BaO, or the CaO are included at greater than 35 wt %, cleanability may be degraded. When the one or more of the MgO, the BaO, or the CaO are included at less than 1 wt %, adhesion between an enamel coating layer and a base steel plate may be decreased, degrading glass stability.

$TiO_2$, $CeO_2$, $MoO_3$, $Bi_2O_3$, and CuO function as catalysts on a surface of an enamel coating layer. Therefore, $TiO_2$, $CeO_2$, $MoO_3$, $Bi_2O_3$, and CuO easily cut attachment between the surface of an enamel coating layer and a contaminant. One or more of $TiO_2$, $CeO_2$, $MoO_3$, $Bi_2O_3$, or CuO may be included at 10 to 25 wt %. When the one or more of the above-listed components are included at greater than 25 wt %, vitrification may be difficult, and thermal properties may be degraded. On the other hand, when one or more of the above-listed components are included at less than 10 wt %, a catalytic reaction on the surface of an enamel coating layer may be reduced, degrading cleanability of enamel.

In addition, the enamel composition according to embodiments may further include aluminum oxide ($Al_2O_3$) at 1 to 20 wt %; zirconium dioxide ($ZrO_2$) at 1 to 5 wt %; and one or more of tin oxide (SnO) or zinc oxide (ZnO) at 1 to 10 wt %. $Al_2O_3$, $ZrO_2$, SnO, and ZnO compensate for low durability of an alkali phosphate glass structure and enhance hardness of the enamel surface. When $Al_2O_3$ is included at greater than 20 wt %, a melting temperature and fusion flow may be increased, degrading adhesion of an enamel coating layer. In addition, when $ZrO_2$ is included at greater than 5 wt % or SnO and/or ZnO are/is included at greater than 10 wt %, a glass structure may not be formed. When each component is included below its lower limit, durability of an enamel coating layer may be degraded.

Additionally, the enamel composition according to embodiments may include the $MoO_3$ at 1 to 10 wt % and the CuO at 1 to 5 wt % to maximize cleanability and prevent durability of an enamel coating layer from being degraded. In a case of a phosphate-based enamel composition, especially when both Mo and Cu are included, cleanability is maximized. When $MoO_3$ is included at greater than 10 wt % and CuO is included at greater than 5 wt %, an addition amount of other components is decreased, and thus, vitrification of enamel may be difficult, and durability may be degraded. On the other hand, when $MoO_3$ is included at less than 1 wt % and CuO is included at less than 1 wt %, cleanability of enamel may be degraded.

In addition, when the enamel composition according to embodiments includes both $MoO_3$ and $Bi_2O_3$, any one of the $MoO_3$ or the $Bi_2O_3$ may be included at 2 wt % or less. Mo and Bi may collide with each other in the phosphate-based enamel composition, and accordingly, metallic crystals may be precipitated on an enamel coating layer. Therefore, when both Mo and Bi are included in the enamel composition according to embodiments, any one of the two components may be included at 2 wt % or less.

As mentioned above, the conventional enamel compositions consume a large amount of energy because the conventional enamel compositions enable cleaning only when heated (pyrolyzed) under a condition of a high temperature of 450 to 500° C. for about 4 hours. However, the enamel composition according to embodiments enables removal of sugar contaminants containing sugar even when heated (pyrolyzed) under a condition of a high temperature of 450 to 500° C. for less than an hour due to having the above-described novel composition ratio. Accordingly, use of the enamel composition according to embodiments provides an effect of energy saving and a reduction in cleaning time. In addition, the enamel composition according to embodiments exhibits a superior oil contaminant cleaning ability. Accordingly, hygiene of a cooking appliance using the enamel composition according to embodiments may be is easily managed.

Method for Preparing Enamel Composition

A method 100 of preparing an enamel composition according to embodiments may include providing the above-described enamel composition materials (120); melting the enamel composition materials (120); and quenching the melted enamel composition materials (130) to form an enamel composition. The materials may be sufficiently blended and then melted. The materials may be melted at 1,200 to 1,400° C. In addition, the materials may be melted for 1 to 2 hours. Afterward, the melted materials may be quenched by a quenching roller using a chiller, for example. As a result, the enamel composition may be formed.

Cooking Appliance

The enamel composition according to embodiments may be applied on one surface of a target object to be coated with the enamel composition. The target object may be a metal plate, a glass plate, or a portion or entirety of a cooking appliance. The enamel composition may be applied onto an inner surface of the cavity of the cooking appliance or an inner surface of the door of the cooking appliance.

Referring to FIG. 1, a cooking appliance 1 according to embodiments may include a cavity 11 that forms a cooking chamber, a door 14 that selectively opens and closes the cooking chamber, one or more heating sources 13, 15, and 16 that provide heat to the cooking chamber, and a coating layer that is formed of the enamel composition according to embodiments applied onto an inner surface of the cavity 11 or an inner surface of the door 14.

The cavity 11 may be formed in a hexahedral shape, a front surface of which is open. The heating sources 13, 15, and 16 may include a convection assembly 13 that discharges heated air into the cavity 11, an upper heater 15 disposed at a top of the cavity 11, and a lower heater 16 disposed at the bottom of a cavity 11. The upper heater 15 and the lower heater 16 may be provided inside or outside of the cavity 11. Of course, the heating sources 13, 15, and 16 do not necessarily include the convection assembly 13, the upper heater 15, and the lower heater 16. That is, the heating sources 13, 15, and 16 may include one or more of the convection assembly 13, the upper heater 15, or the lower heater 16.

Figure 3:
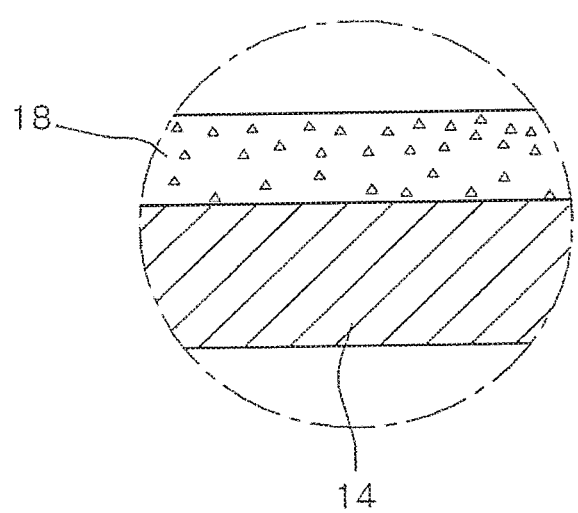
FIG. 3 is a partially enlarged cross-sectional view of an inner surface of a door of the cooking appliance of FIG. 1.
Figure 4:
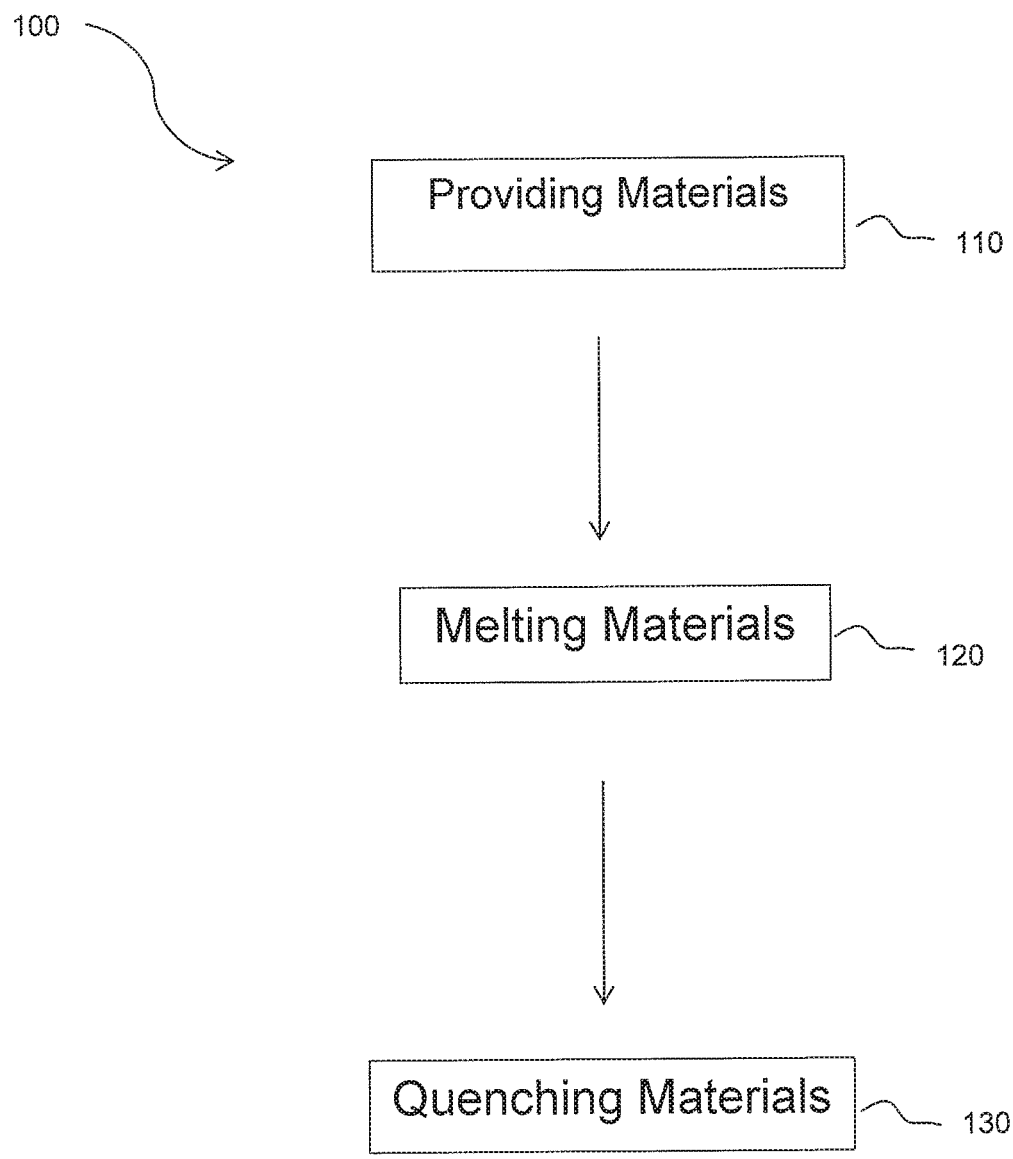
FIG. 4 is a flow chart of method for preparing an enamel composition according to an embodiment.

Referring to FIG. 3 and FIG. 4, the enamel composition according to embodiments may be applied onto an inner surface of the cavity 11 of the cooking appliance 1 or an inner surface of the door 14 thereof by a dry process or a wet process. The cavity 11 and the door 14 may be formed of a metal plate, and coating layers 17 and 18 formed of the enamel composition according to embodiments may be directly formed as a single layer on the metal plate.

According to the dry process, the enamel composition materials may be dispersed in an organic binder, and the enamel composition materials and organic binder, which have been blended, may be subjected to milling in a ball mill to prepare frit. On the other hand, according to the wet process, the enamel composition materials may be dispersed in water ($H_2O$) and a pigment, and the enamel composition materials; water ($H_2O$), and pigment, which have been blended, may be subjected to milling in a ball mill to prepare frit.

Afterward, the frit prepared by the dry process or the wet process may be applied onto an inner surface of the cavity 11 of the cooking appliance 1 or an inner surface of the door 14 thereof by a spraying method. The applied frit may be fired at 600 to 900° C. for 100 to 450 seconds and applied on an inner surface of the cavity 11 of the cooking appliance 1 or an inner surface of the door 14 thereof.

Hereinafter, embodiments will be described with respect to examples.

Examples

Preparation of Enamel Composition

Enamel compositions were prepared in the compositions shown in Table 1 below. Raw materials of components were sufficiently blended in a V-mixer for 3 hours. In this case, ammonium dihydrogen phosphate ($NH_4H_2PO_4$) was used as a raw material of phosphorus pentoxide ($P_2O_5$), and sodium carbonate ($Na_2CO_3$), potassium carbonate ($K_2CO_3$), and lithium carbonate ($Li_2CO_3$) were used, respectively, as raw materials of $Na_2O$, $K_2O$, and $Li_2O$. The blended material was sufficiently melted at 1,300° C. for one and a half hours and then quenched in a quenching roller to obtain cullet.

An initial particle size of the cullet thus obtained by the above process was controlled using a grinder (ball mill), and then, the resulting cullet was ground using a jet mill for about 5 hours and passed through a 325 mesh sieve (ASTM C285-88) to control the particle diameter thereof to be 45 μm or less, thereby preparing frit (a powder).

TABLE 1

| Components (wt %) | Examples | | | | Comparative Examples | |
|---|---|---|---|---|---|---|
| | 1 | 2 | 3 | 4 | 1 | 2 |
| $SiO_2$ | 13.82 | 14.97 | 13.49 | 14.16 | 0 | 42.7 |
| $P_2O_5$ | 21.2 | 20.2 | 22.98 | 24.13 | 45.31 | 0 |
| $B_2O_3$ | 11.66 | 9.41 | 9.73 | 10.22 | 0 | 0 |
| $Na_2O$ | 4 | 4.79 | 4.06 | 4.27 | 1.95 | 1.95 |
| $K_2O$ | 9.94 | 10.76 | 11.24 | 11.8 | 4.79 | 4.79 |
| $Li_2O$ | 0.84 | 0.91 | 0 | 0 | 0 | 0 |
| NaF | 1.67 | 1.81 | 1.55 | 1.62 | 0 | 0 |
| MgO | 0 | 0 | 0 | 0 | 7.59 | 10.2 |
| $Al_2O_3$ | 15.9 | 17.21 | 14.82 | 15.56 | 0 | 0 |
| CaO | 0 | 0 | 0 | 0 | 2.9 | 2.9 |
| $TiO_2$ | 0.85 | 0.92 | 18.55 | 1.33 | 1.95 | 1.95 |
| CuO | 3.39 | 0 | 0 | 10 | 0 | 0 |
| ZnO | 5.09 | 0 | 0 | 0 | 0.97 | 0.97 |
| $ZrO_2$ | 2.31 | 4.34 | 2.31 | 2.43 | 0 | 0 |
| $MoO_3$ | 9.33 | 1.84 | 1.27 | 4.48 | 9.89 | 9.89 |
| SnO | 0 | 0.92 | 0 | 0 | 0 | 0 |
| BaO | 0 | 0 | 0 | 0 | 19.71 | 19.71 |
| $Bi_2O_3$ | 0 | 9.17 | 0 | 0 | 4.94 | 4.94 |
| $CeO_2$ | 0 | 2.75 | 0 | 0 | 0 | 0 |

Manufacture of Enamel Composition Specimen

Each of the frits prepared using the enamel compositions according to Examples 1 to 5 and Comparative Examples 1 and 2 was sprayed on a low carbon steel sheet having an area of 200 (mm)×200 (mm) and a thickness of 1 (mm) or less using a corona discharge gun. In this case, a voltage of the discharge gun was controlled under a condition within the range of 40 kV to 100 kV, and an amount of the frit sprayed on the low carbon steel sheet was 300 g/m². The low carbon steel on which the frit had been sprayed was fired at 830° C. to 870° C. for 300 to 450 seconds to form a coating layer on one surface of the low carbon steel. In this case, the coating layer was formed to have a thickness of about 80 μm to 250 μm. As a result, specimens according to Examples 1 to 7 and Comparative Examples 1 to 3 were manufactured, Experimental Example The specimens according to Examples and Comparative Examples were evaluated for abilities as described below, and results thereof are shown in Table 4.

1. Cleanability Against Chicken Oil Contaminant 1 g of chicken oil as a contaminant was uniformly and thinly spread on a surface of the specimen, in which a metal substrate (100 (mm)×100 (mm)) had been coated with the enamel composition, with a brush, and the specimen to which the contaminant had been applied was placed in a thermostat at 250 to 290° C. for an hour to solidify the contaminant. After solidification of the contaminant, the resulting specimen was cooled naturally, and the contaminant was burned at 400° C. for an hour. Afterward, the hardened contaminant was subjected to back and forth (one round trip) wiping at a force of 3 kgf or less with a scouring pad for a frying pan which had been soaked with room-temperature water. A portion wiped on the contaminated specimen surface was uniformalized using a stick whose bottom has a diameter of 5 cm and is flat.

2. Cleanability Against Monster Mash

In addition, cleanability against monster mash was measured by the same method as described above. In this case, a number of round trips of wiping the specimen was measured and defined as the number of round trips for cleaning, and evaluation standards for cleanability are shown in Table 2.

TABLE 2

| Number of round trips for cleaning | Level |
|---|---|
| 1~5 | LV.5 |
| 6~15 | LV.4 |
| 16~25 | LV.3 |
| 26~50 | LV.2 |
| 51~ | LV.1 |

3. Evaluation of Durability

The specimens which had undergone the cleaning test according to the above item 2 were evaluated for durability, such as heat resistance and chemical resistance. The durability of each specimen was evaluated by determining a staining phenomenon. The staining phenomenon was determined by observing the surface of each specimen and quantifying a ratio of the area of the residue or stain to the entire surface area. Evaluation standards for the staining phenomenon are the same as shown in Table 3.

TABLE 3

| Stained area ratio | Level |
|---|---|
| 0% | LV.5 |
| ~20% | LV.4 |
| ~50% | LV.3 |
| ~80% | LV.2 |
| 80%~ | LV.1 |

TABLE 4

|  | Examples | | | | Comparative Examples | |
| --- | --- | --- | --- | --- | --- | --- |
|  | 1 | 2 | 3 | 4 | 1 | 2 |
| Cleanability against chicken oil | LV.5 | LV.5 | LV.5 | LV.5 | LV.2 | LV.2 |
| Cleanability against monster mash | LV.5 | LV.5 | LV.5 | LV.5 | LV.2 | LV.1 |
| Stain level | LV.5 | LV.5 | LV.5 | LV.5 | LV.2 | LV.1 |

As shown in Table 4, it can be seen that Examples according to embodiments exhibited not only excellent cleanability but also excellent durability. On the other hand, it can be seen that Comparative Examples exhibited not only degraded cleanability due to not having an optimal composition ratio but also highly unsatisfactory durability due to an unstable glass composition, as compared with Examples according to embodiments.

The enamel composition according to according to embodiments may dramatically reduce a heating time in comparison to a conventional enamel composition. Accordingly, the enamel composition according to embodiments may save energy consumed in cleaning due to the shortened heating time.

Further, the enamel composition according to embodiments may allow especially oil contaminants to be completely removed. Accordingly, the enamel composition according to embodiments may enhance hygiene of a cooking appliance Furthermore, the enamel composition according to embodiments may exhibit enhanced adhesion to a base steel plate and also ensure excellent cleanability due to a special component ratio. Also, as the enamel composition according to embodiments may include a phosphate-based component in an optimal composition ratio, it can exhibit high heat resistance and high chemical durability as well as excellent cleanability. Additionally, as the enamel composition according to embodiments may be directly applied as a single layer onto a base steel plate in the absence of an intermediate buffer layer, the layer may be simply formed.

Embodiments disclosed herein provide a novel enamel composition which allows a heating time required for cleaning to be shortened. Embodiments disclosed herein provide a novel enamel composition which allows oil contaminants to be completely removed. Further, embodiments disclosed herein provide a novel enamel composition which is excellent in not only cleanability but also durability, such as heat resistance and chemical resistance.

In order to provide an enamel composition which enables cleaning while shortening a heating time in comparison to a conventional enamel composition, a enamel composition according to embodiments may include $P_2O_5$ at 15 to 50 wt %; $SiO_2$ at 10 to 20 wt %; $B_2O_3$ at 1 to 15 wt %; one or more of $Li_2O$, $Na_2O$, or $K_2O$ at 5 to 20 wt %; one or more of NaF, $CaF_2$, or $AlF_3$ at 1 to 5 wt %; one or more of MgO, BaO, or CaO at 1 to 35 wt %; and one or more of $TiO_2$, $CeO_2$, $MoO_3$, $Bi_2O_3$, or Cu© at 10 to 25 wt %. In addition, in order to provide a phosphate-based enamel composition which enables removal of oil contaminants, that is, which exhibits maximized cleanability, an enamel composition according to embodiments may, when both the $MoO_3$ and the $Bi_2O_3$ are included, any one of the $MoO_3$ or the $Bi_2O_3$ at 2 wt % or less.

Additionally, in order to provide a novel enamel composition which exhibits high heat resistance and high chemical durability as well as excellent cleanability, an enamel composition according to embodiments may further include $Al_2O_3$ at 1 to 20 wt %; $ZrO_2$ at 1 to 5 wt %; and one or more of SnO or ZnO at 1 to 10 wt % and may include the $MoO_3$ at 1 to 10 wt % and the CuO at 1 to 5 wt %.

Although embodiments have been described above with reference to the illustrated drawings, it is obvious that embodiments are not limited to the embodiments and drawings disclosed herein, and various modifications may be made by those skilled in the art within the spirit and scope. In addition, even when the effect of the configuration is not explicitly described while the above-described embodiments are described, it is obvious that the effect predictable by the corresponding configuration should also be recognized.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a" "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A cooking appliance, comprising:
    a cavity that forms a cooking chamber;
    a door that selectively opens and closes the cooking chamber;
    at least one heating source that provides heat to the cooking chamber; and
    a coating layer formed of an enamel composition applied onto an inner surface of the cavity or an inner surface of the door, wherein the enamel composition comprises:
        phosphorus pentoxide ($P_2O_5$) at 15 to 50 wt %;
        silicon dioxide ($SiO_2$) at 10 to 20 wt %;
        boron oxide ($B_2O_3$) at 1 to 15 wt %;
        one or more of lithium oxide ($Li_2O$), sodium oxide ($Na_2O$), or potassium oxide ($K_2O$) at 5 to 20 wt %;
        one or more of sodium fluoride (NaF), calcium fluoride ($CaF_2$), or aluminum fluoride ($AlF_3$) at 1 to 5 wt %;
        one or more of magnesium oxide (MgO), barium oxide (BaO), or calcium oxide (CaO) at 1 to 35 wt %; and
        one or more of titanium dioxide ($TiO_2$), cerium dioxide ($CeO_2$), molybdenum trioxide ($MoO_3$), bismuth oxide ($Bi_2O_3$), or copper oxide (CuO) at 10 to 25 wt %, wherein when both the $MoO_3$ and the $Bi_2O_3$ are included, any one of the $MoO_3$ or the $Bi_2O_3$ is included at 2 wt % or less.

2. The cooking appliance of claim 1, wherein the enamel composition further comprises:
    aluminum oxide ($Al_2O_3$) at 1 to 20 wt %;
    zirconium dioxide ($ZrO_2$) at 1 to 5 wt %; and
    one or more of tin oxide (SnO) or zinc oxide (ZnO) at 1 to 10 wt %.

* * * * *